No. 787,688. PATENTED APR. 18, 1905.
C. J. PARKER.
COOKER.
APPLICATION FILED DEC. 7, 1904.
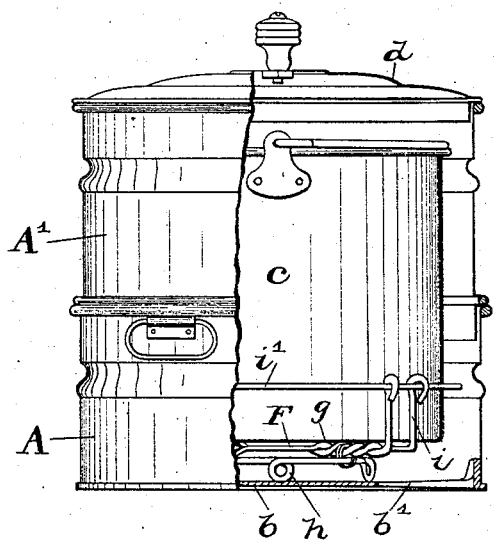
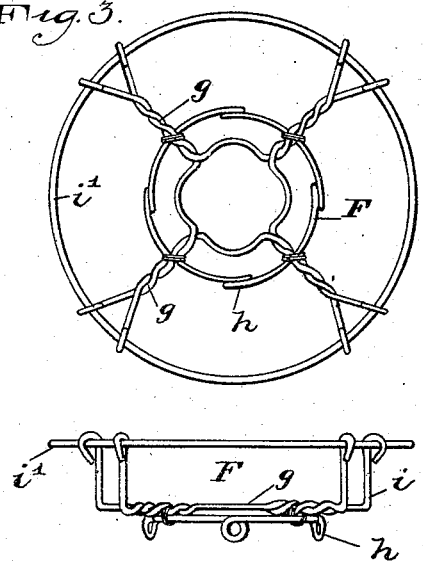
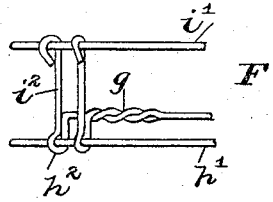
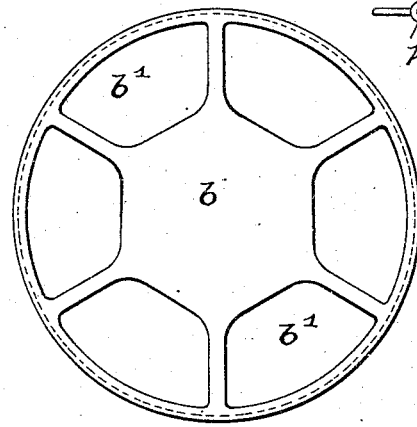
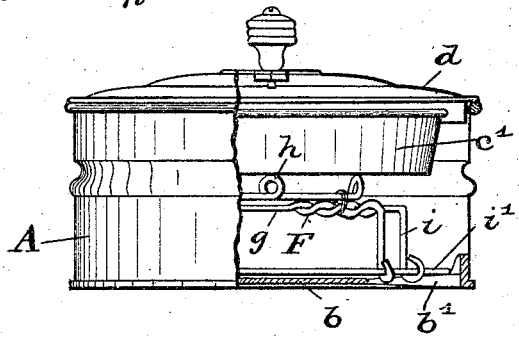
Witnesses.
J. H. Sirich jr.
G. Ferdinand Vogt.
Inventor.
Charles J. Parker
By Mann & Co,
Attorneys.

No. 787,688. Patented April 18, 1905.

UNITED STATES PATENT OFFICE.

CHARLES J. PARKER, OF HAVRE DE GRACE, MARYLAND.

COOKER.

SPECIFICATION forming part of Letters Patent No. 787,688, dated April 18, 1905.

Application filed December 7, 1904. Serial No. 235,797.

*To all whom it may concern:*

Be it known that I, CHARLES J. PARKER, a citizen of the United States, residing at Havre de Grace, in the county of Harford and State of Maryland, have invented certain new and useful Improvements in Cookers, of which the following is a specification.

This invention relates to improvements in cookers of that class which comprise an outer casing with a perforated bottom and which when placed on an ordinary stove-top confine the heat and cause it to completely surround a vessel inclosed within the casing, said vessel containing the food to be cooked.

The invention consists of the combination, with such a cooker, of an internal stand having two sets of feet, one set being higher than the other, and said stand being invertible within the outer case, whereby the same stand will support the cooking vessel at different elevations.

The invention is illustrated in the accompanying drawings, in which—

Figure 1 is an elevation, part of the outer casing being broken away to show the inner cooking vessel supported on the stand in the low position. Fig. 2 is a view of the open bottom of the case. Fig. 3 is a plan view of the wire stand. Fig. 4 is a side elevation of the stand. Fig. 5 is an elevation, part of the outer casing being broken away and showing a cooking vessel supported on the stand in the high position. Fig. 6 shows a slight modification in the construction of the wire stand.

The letter A designates the base-section or metal wall of an outer case, having a metal bottom $b$, provided with large openings $b'$. An upper section $A'$ is constructed to surmount the base-section, upon which it makes a tight fit, and may be used with the latter or not, according to the height of the inner cooking vessel $c$ or $c'$. A cover $d$ will fit snugly on the top of either the base-section or upper section.

The invertible stand F has a supporting-surface $g$ and on one side a set of short feet $h$ and on the opposite side a set of longer feet $i$, connected by a wire ring $i'$. This stand is within the case and rests upon the open bottom $b$. The construction is such that when the short feet $h$ are lowermost, as in Figs. 1 and 4, a cooking vessel may be supported without any regard to the longer feet, which project upward—that is, the bottom of the cooking vessel resting on the surface $g$ may have a low position, as in Fig. 1, with respect to the open bottom $b$. When the stand F is inverted, so as to bring the longer feet $i$ lowermost, as in Fig. 5, the bottom of a cooking vessel will rest on the upturned short feet $h$ and will have a high position with respect to the open bottom $b$. It is important that means should thus be provided for supporting the cooking vessel so that its bottom may be higher or lower relative to the open bottom $b$, because some articles of food in cooking cannot be subjected to as close relation to the heat-generator (the stove-top in this case) as others—for instance, a baked custard, which should be supported by the longer legs. Other articles, like cereals or fruits, will bear more heat and may be supported on the short legs. Other articles, like cabbage, will bear a still higher degree of heat, and for such the stand F may be removed entirely from the cooker, and the cooking vessel in such case may rest directly upon the open bottom $b$.

It will be noted that the particular form or depth of the cooking vessel is immaterial. The cook will select such a vessel as will best suit for the article to be cooked. In Fig. 1 a high-walled enameled kettle $c$ is shown, and in Fig. 5 a low-walled bake-pan $c'$ is shown.

The particular construction of invertible stand having feet of two heights may be varied. A modification is shown in Fig. 6, where each one of the set of short feet $h^2$ is in the same vertical plane as the longer feet $i^2$, and these are connected by a wire ring $h'$, whereas in Fig. 4 the short feet $h$ are arranged on a smaller circle than the longer feet $i$.

Cookers of this class may be used on cook-stoves, ranges, and also on gas or vapor stoves. Vegetables that give off objectionable odors may be cooked on stoves or ranges, where a stove-lid is removed and the cooker set directly over the open hole. In this way the steam and odors in the cooker will be drawn down into the fire and pass off.

Having thus fully described my invention, what I claim as new, and desire to secure by Letters Patent, is—

A cooker having in combination an outer case provided with a perforated bottom; an invertible stand within said case and resting on the bottom and having two sets of feet— one set being higher than the other, and the feet of each set projecting in opposite directions; and a cooking vessel in said case supported on said stand.

In testimony whereof I affix my signature in presence of two witnesses.

CHARLES J. PARKER.

Witnesses:
   H. C. FOSTER,
   M. S. PARKER.